Patented June 7, 1949

2,472,663

UNITED STATES PATENT OFFICE 2,472,663

CATTLE FEED

Carl Wilhelm August Kleine and Milena Regina Stella Kleine, Stockholm, Sweden

No Drawing. Application June 19, 1946, Serial No. 677,905. In Sweden November 20, 1940

5 Claims. (Cl. 99—2)

The present invention relates to an improved cattle-feed and methods of producing the same. More specifically our invention relates to cattle-feed consisting of fat emulsions or dispersions of the oil-in-water type with possible additions of one or several of the following usual ingredients in cattle-feed or emulsions, such as carbohydrates, proteins, emulsifying agents, phosphatides, vitamin-preparations, and preserving agents.

The expression "emulsion" is in the following to be understood as including all such dispersions of fat which during their formation are in the emulsion state (liquid-in-liquid) although at certain temperatures the discontinuous phase may be in a solid or semi-solid state e. g. similar to milk.

A characteristic feature of the invention is that the fatty component of the feed is produced from fat chiefly, preferably to at least 75 per cent of animal origin and having, at least in regard to its content of glycerol esters of higher fatty acids such as palmitic, stearic, and oleic acid, a composition nearly corresponding to that of butter-fat, the process of preparing the emulsion being carried out in such manner that the obtained dispersion both in a concentrated and diluted state will contain not more than 25 per cent of the fat in the form of globulae with a diameter exceeding 30 microns (0.03 millimeters).

By the expression "a composition nearly corresponding to that of butter-fat" we mean that at least the proportions of stearic, palmitin, and olein in the fat-mixture should correspond to those generally found in butter-fat. More specifically we may state that the proportions of palmitic, stearic, and higher unsaturated fatty acids contained as glycerides in the dispersed fat-phase should be within the following percentages by weight:

| | Per cent |
|---|---|
| Palmitic acid | 21-30 |
| Stearic acid | 5-15 |
| Unsaturated (oleic, linoleic etc.) acids | 35-70 |

The amount of lower fatty acids, if present, should suitably be within the following range: caprylic, capric, and lauric acids 5-10%, and myristic acid 2-10% by weight of the total fatty acid content.

According to a suitable embodiment of the invention the emulsion is taken up by porous solid fodder substances, preferably substances rich in albumins or proteins, so that a mixture which feels dry and which contains the high-disperse fat-emulsion is obtained. Other features and embodiments will be evident from the following description.

During the past fifty years a number of preparations intended as substitutes for milk-fat in the feeding of young cattle and containing various other fats have been placed on the market but generally failed to serve the purpose. In most cases the fat has in some way been brought into emulsion-form but due attention has not been paid either to the composition of the employed fat, its content of free fatty acids, its melting point, or its degree of dispersion in the original emulsion or in the feed-mixtures prepared therefrom.

Our investigations have demonstrated that an important condition for enabling the tender animal digestive organism to utilize the fatty substances in the feed is that these are contained in the feed in the above mentioned dispersity, i. e. that not more than 25 per cent of the fat-globulae in the oil-in-water type emulsion have a diameter exceeding 30 microns and that the fat is chiefly of animal origin, having in regard to the glycerides contained therein a composition similar to that of butter-fat. Although certain preparations have been available for feeding purposes in the form of high-disperse emulsions they have failed because of insufficient stability, whereby the small fat-globulae have assembled to form larger drops of fat which has had a detrimental influence on the digestive apparatus of the animal, in addition to which too much vegetable fat has been contained in the preparations. Our investigations have also demonstrated that the melting point of the fat or fat-mixture employed should be adjusted to between 20° and 40° C. and that the composition should be such, that the content of free fatty acids does not exceed 3 per cent by weight of the total amount of fat present.

The importance of observing the above stated conditions in accordance with the invention is demonstrated by the fact which we have verified by numerous animal tests that already a relatively small amount of larger fat-drops in the feed will act as a cathartic and that larger percentages will inevitably cause diarrhea or still worse disturbances in the digestive organs of the animal. The same effect is as a rule caused by a fat having too high or too low melting point and is also produced when the percentage of free fatty acid is too high. Although the above stated figures according to our invention may be considered as critical it is of course suitable to employ such emulsions which contain considerably less than 25 per cent of the fat in larger globulae than 30 microns and which, for instance, only contain dispersed fat-particles having diameters below 30 microns, the main part in most cases preferably not being over 15 microns in diameter in order to obtain perfect safety against the above mentioned cathartic effect, particularly in feeding young and tender animals with emulsions of this kind.

The continuous phase of the oil-in-water type emulsion may suitably consist of skim-milk, whereby the proper amount of mineral salts is at the same time imparted to the feed. The concentration of fat in the emulsions prepared according to the invention is immaterial, since good results are obtained with for instance a 5 per cent emulsion as well as with one containing 90 per cent fat, the main thing being the above mentioned high dispersity as well as the other conditions which characterize the invention.

The emulsion as such, with possible additions of other materials, such as emulsifying agents of any suitable type to insure good stability, carbohydrates such as molasses or the like, proteins, mineral salts, vitamin-preparations and preserving agents known in the art to be used in cattle-feed and added in suitable quantities, may be used as a liquid feed either alone or in mixture with other usual stock food substances poor in fat, such as straw, hay, grass, bran, extracted oil-seed etc.

A very suitable type of cattle-feed according to the invention is produced by preparing a liquid emulsion with such a high dispersity that practically all of the fat is contained therein as globulae having diameters below 30 microns and to absorb the emulsion in porous, solid fodder-substances, preferably such substances rich in proteins as for instance meal of soya bean press cakes with possible additions of other similar substances having lower content of albumin or protein such as bran and the like, which solid substances are added in such proportions that a mixture is obtained which feels dry. By using such a high dispersity of the fat as provided in our invention, very stable emulsions are obtained which do not break up when in contact with the absorbing substances but which remain in their highly dispersed form in the mixture, whereby the fat is made available to the animal organism at the same time a product is obtained which can be kept in storage and be easily transported and which is suitable for large scale factory production.

Another suitable way of preparing a useful dry product according to the invention is to evaporate the continuous water phase, e. g. by spray-drying the emulsion, so that a powder is obtained in which the fat is contained in the above mentioned highly dispersed state.

The emulsions according to the invention are in their original liquid more or less diluted or concentrated form, or after having been absorbed in or mixed with other vegetable or animal stock feed substances such as hay, straw, bran, digestible paper pulp (so called fodder-cellulose) meat meal, press-cake from vegetable oil manufacture, fish meal, bone meal etc., particularly useful for raising or fattening of cattle, pigs and poultry.

The following examples are illustrative but not limiting for the invention:

*Example 1*

| | Percent by weight |
|---|---|
| Bone fat | 75 |
| Coconut oil | 10 |
| Soy bean oil | 15 |

The emulsion is suitably prepared in two stages. In the first stage an unstable emulsion of the desired type and concentration is prepared from the fat-mixture and water or skim-milk which emulsion in a second stage is homogenized and made stable by treatment in any suitable implement used for such purposes in the dairy-industry.

The emulsion may be used as such in suitable concentration or dilution or in mixture with other feed-substances as described in the foregoing.

*Example 2*

| | Percent by weight |
|---|---|
| Horse-fat oil | 80 |
| Coconut oil | 10 |
| Linseed oil | 10 |

The emulsion is prepared and used as in Example 1.

*Example 3*

| | Percent by weight |
|---|---|
| Bone fat | 60 |
| Tallow | 15 |
| Vegetable oils | 15 |
| Palm kernel fat | 10 |

The fat-mixture is with or without addition of e. g. emulsifying agents, carbohydrates, proteins, mineral salts, vitamin preparations and preserving agents dispersed in water or water containing media, such as skim-milk, to form an emulsion with a fat-content of 66%. This emulsion is suitably mixed with the ordinary fat-deficient fodder given to the animals.

We claim:

1. A cattle-feed comprising highly dispersed particles of fats of both vegetable and animal origin, glycerides of palmitic acid, of stearic acid and of the higher unsaturated fatty acids being present in the relative proportions by weight of 21 to 30 per cent, 5 to 15 per cent and 35 to 70 per cent, respectively, the fat mixture having a melting point within the range of 20° to 40° C., not over 25 per cent of said fat particles having a diameter exceeding 30 microns, the free fatty acid content of said fats not exceeding 3 per cent by weight, the bulk of the fats present being of animal origin.

2. The cattle-feed of claim 1 wherein the fat content constitutes the spray dried residue of a highly dispersed aqueous emulsion of said fats.

3. The cattle-feed of claim 1 wherein the highly dispersed particles of fats are absorbed in a porous solid stock-feed.

4. The cattle-feed of claim 3 wherein said porous stock-feed is a digestible paper pulp.

5. The cattle-feed of claim 1 in which the fat particles are dispersed in a medium of skim milk.

CARL WILHELM AUGUST KLEINE.
MILENA REGINA STELLA KLEINE.

REFERENCES CITED

The following references are of record in the file of this patent:

UNITED STATES PATENTS

| Number | Name | Date |
|---|---|---|
| 1,831,164 | Dawe | Nov. 10, 1931 |
| 2,302,927 | Whitmoyer et al. | Nov. 14, 1942 |
| 2,395,067 | Richardson | Feb. 19, 1946 |

FOREIGN PATENTS

| Number | Country | Date |
|---|---|---|
| 301,651 | Great Britain | 1928 |